United States Patent [19]
Lee

[11] Patent Number: 5,928,536
[45] Date of Patent: Jul. 27, 1999

[54] ELECTRIC SOLDERING IRON WITH HEATING ENERGY REGULATING CONTROL MEANS

[76] Inventor: Cheng-Liang Lee, 4 Fl., No. 3, Lane 52, Yu-Sheng St., Tu-Cheng City, Taipei Hsien, Taiwan

[21] Appl. No.: 09/157,362

[22] Filed: Sep. 21, 1998

[51] Int. Cl.⁶ .................................................. H05B 1/00
[52] U.S. Cl. ........................ 219/229; 219/248; 219/251
[58] Field of Search ................................. 219/229, 506, 219/497, 248, 241

[56] References Cited

U.S. PATENT DOCUMENTS

| | | | |
|---|---|---|---|
| 4,334,147 | 6/1982 | Payne | 219/497 |
| 4,404,462 | 9/1983 | Murray | 219/497 |
| 4,580,038 | 4/1986 | O'Loughlin | 219/506 |
| 4,692,589 | 9/1987 | Borsari et al. | 219/251 |
| 4,945,210 | 7/1990 | Yoshimura | 219/241 |
| 5,043,560 | 8/1991 | Masreliez | 219/497 |
| 5,485,392 | 1/1996 | Frederickson et al. | 364/477.06 |
| 5,495,093 | 2/1996 | Griffith | 219/497 |
| 5,747,778 | 5/1998 | Liu | 219/506 |

FOREIGN PATENT DOCUMENTS 4127156  2/1993  Germany .

*Primary Examiner*—Teresa Walberg
*Assistant Examiner*—Vinod D Patel
*Attorney, Agent, or Firm*—Bacon & Thomas

[57] ABSTRACT

An electric soldering iron includes a perforated metal barrel having a front end and a rear end, a soldering tip axially extended from the front end of the soldering tip, a handle having a front end and a rear end, a connector connected between the rear end of the perforated metal barrel and the front end of the handle, a power cord extended out of the rear end of the handle, an electric heater installed in the perforated barrel and connected between the soldering tip and the power cord, an integrated control circuit installed in the handle for heating energy regulating control, a multi-step control switch mounted on the handle and connected to the integrated control circuit, and a LCD provided at the handle to display values selected through the multi-step control switch.

5 Claims, 4 Drawing Sheets

ELECTRIC SOLDERING IRON WITH HEATING ENERGY REGULATING CONTROL MEANS

BACKGROUND OF THE INVENTION

(a) Field of the Invention

The present invention relates to an electric soldering iron, and more particularly to such an electric soldering iron which has an integrated heating energy regulating control circuit installed in the handle thereof and controlled by a key switch button to regulate the heating energy of the soldering tip, and has a LCD for the display of controlled values.

(b) Description of the Prior Art

When regulating the heating energy of a regular electric soldering iron, an independent temperature control device must be used and connected to the power circuit of the electric soldering iron. Because the temperature control device is separately prepared, it is inconvenient in use. It is also inconvenient to carry a separate temperature control device with an electric soldering iron. Further, conventional temperature control devices for this purpose commonly use a "photo regulator" to achieve the regulation of heating energy. This control methods can not accurately achieve the desired heating energy control, or indicate the value of power consumed and the value of heating energy produced. Furthermore, when a temperature control device is used, an interference problem may occur. These problems greatly affect the performance of the soldering work.

SUMMARY OF THE INVENTION

The present invention has been accomplished to provide an electric soldering iron which eliminates the aforesaid problems. It is one object of the present invention to provide an electric soldering iron which has integrated heating energy regulating control circuit means in it for enabling the user to control the heating energy conveniently when soldering. It is another object of the present invention to provide an electric soldering iron with integrated heating energy regulating control circuit means that can be conveniently operated to accurately control the desired heating energy without causing an interference. According to one aspect of the present invention, the electric soldering iron comprises a perforated metal barrel having a front end and a rear end, a soldering tip axially extended from the front end of the soldering tip, a handle having a front end and a rear end, a connector connected between the rear end of the perforated metal barrel and the front end of the handle, a power cord extended out of the rear end of the handle, an electric heater installed in the perforated barrel and connected between the soldering tip and the power cord, an integrated control circuit installed in the handle for heating energy regulating control, and a multi-step control switch mounted on the handle and connected to the integrated control circuit. According to another aspect of the present invention, a power saving LCD is provided at the handle for displaying values selected through the multi-step control switch, and a triggering signal is obtained by means of a digital shifting and synthesizing method to precisely control a thyristor, causing the heating temperature of the soldering iron to be accurately controlled with less consumption of power. According to still another aspect of the present invention, the fully digitized control method accurately achieves the desired heating energy regulating control, and eliminates a noise interference by means of a zero crossing full cycle output.

DETAILED DESCRIPTION OF THE PREFERRED EMBODIMENT

Figure 1:
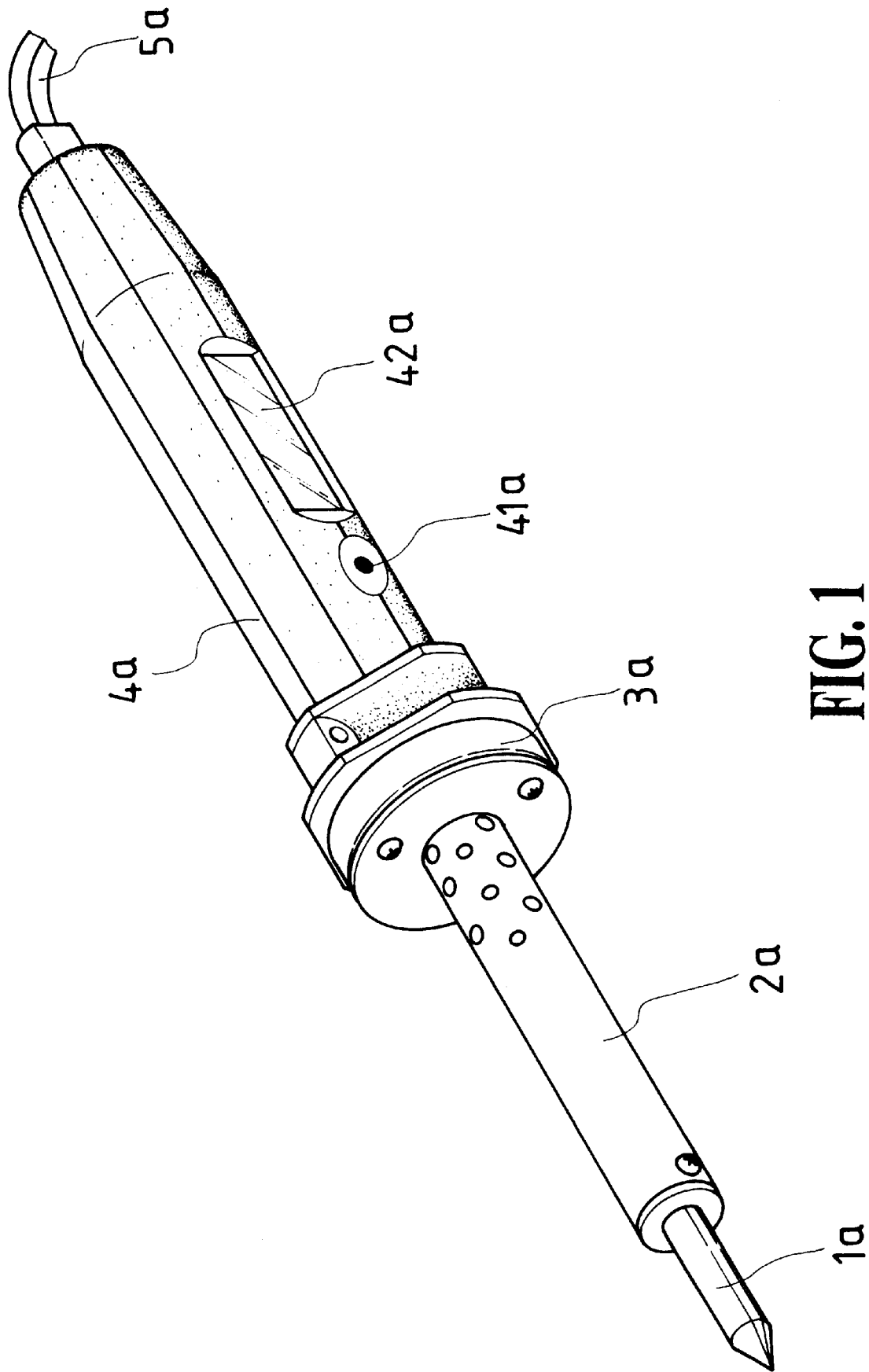
FIG. 1 is a perspective view of an electric soldering iron according to the present invention.
Figure 2:
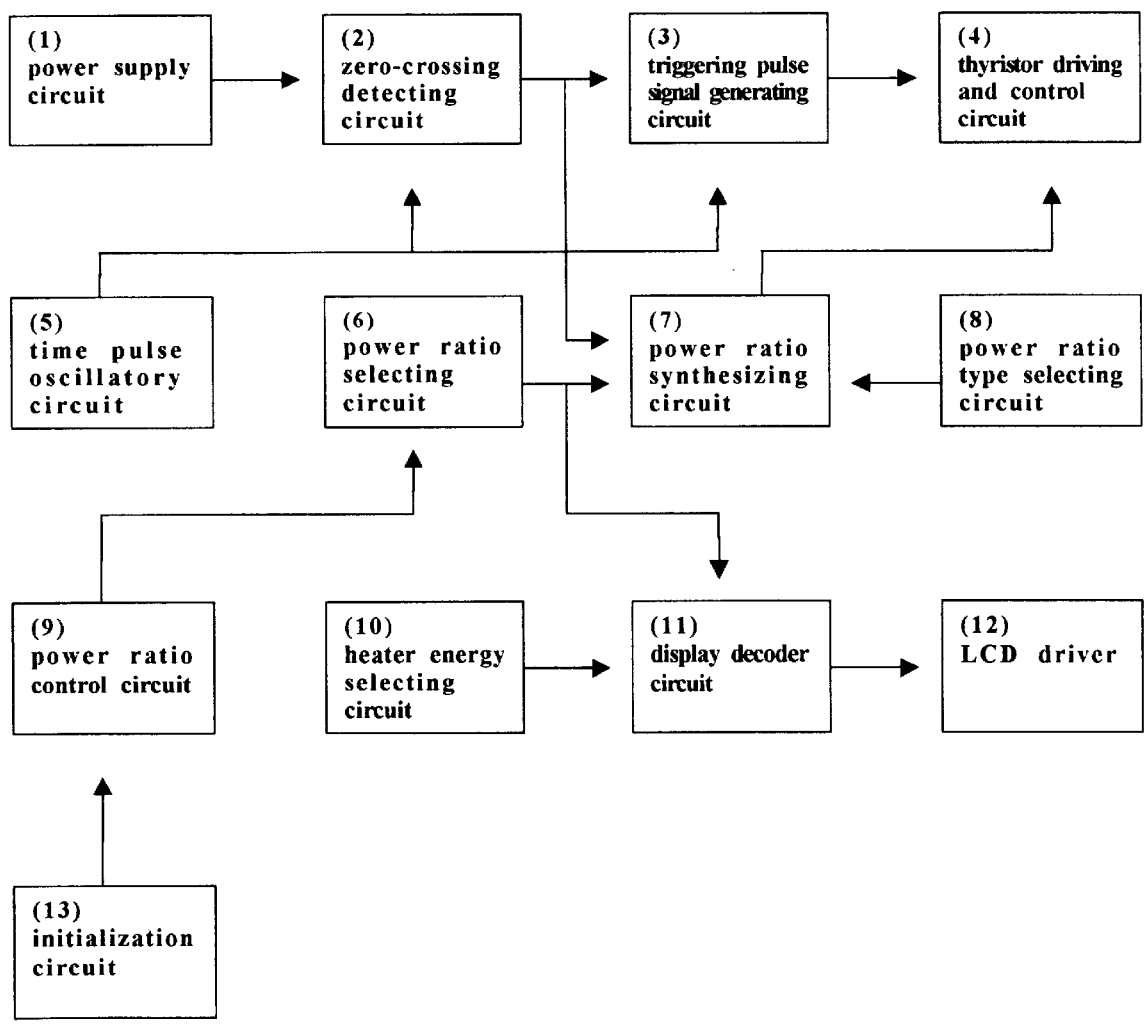
FIG. 2 is a circuit block diagram of the present invention.
Figure 3:
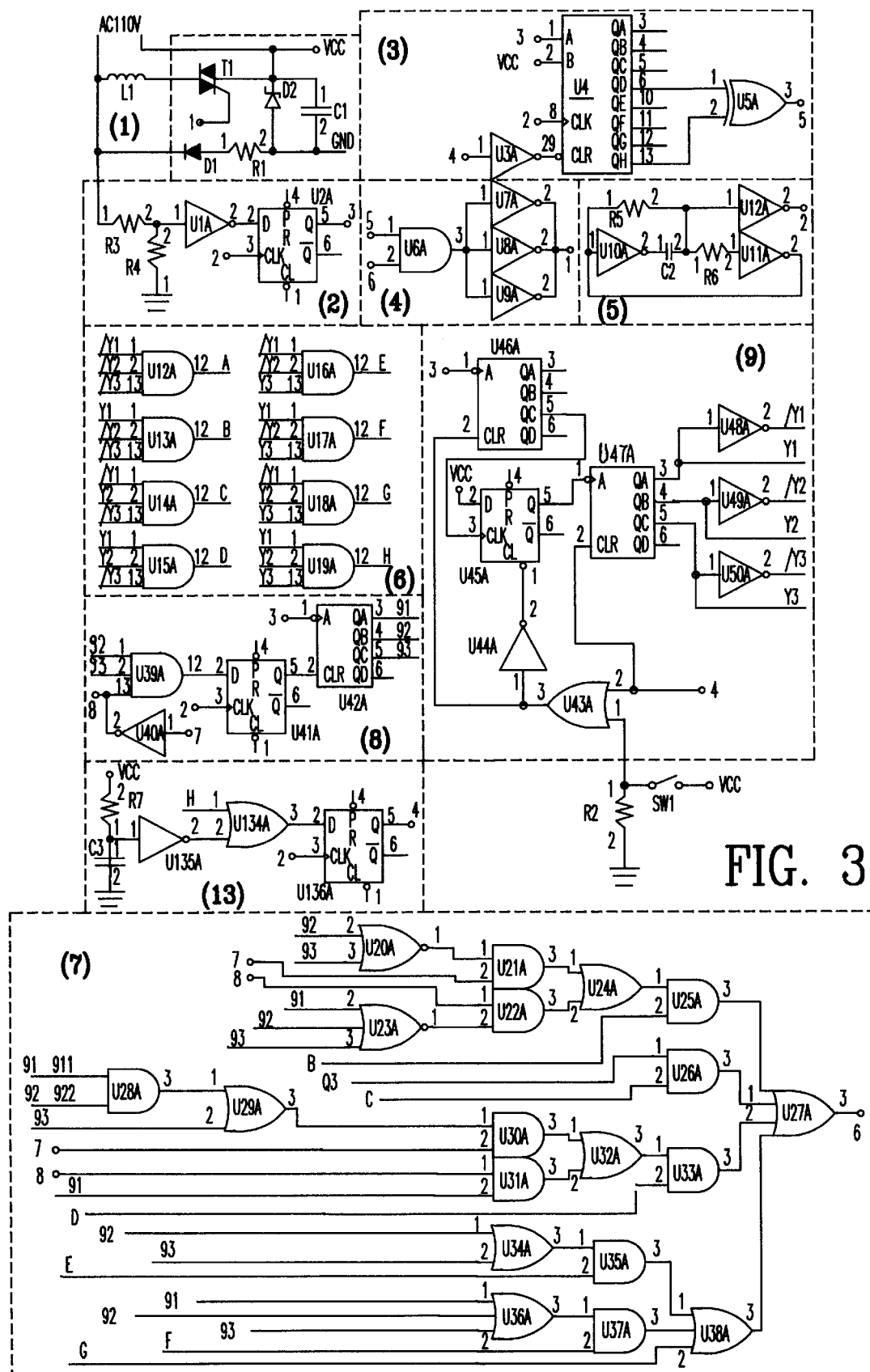
FIG. 3 is a detailed circuit diagram of the present invention (Part-I).
Figure 4:
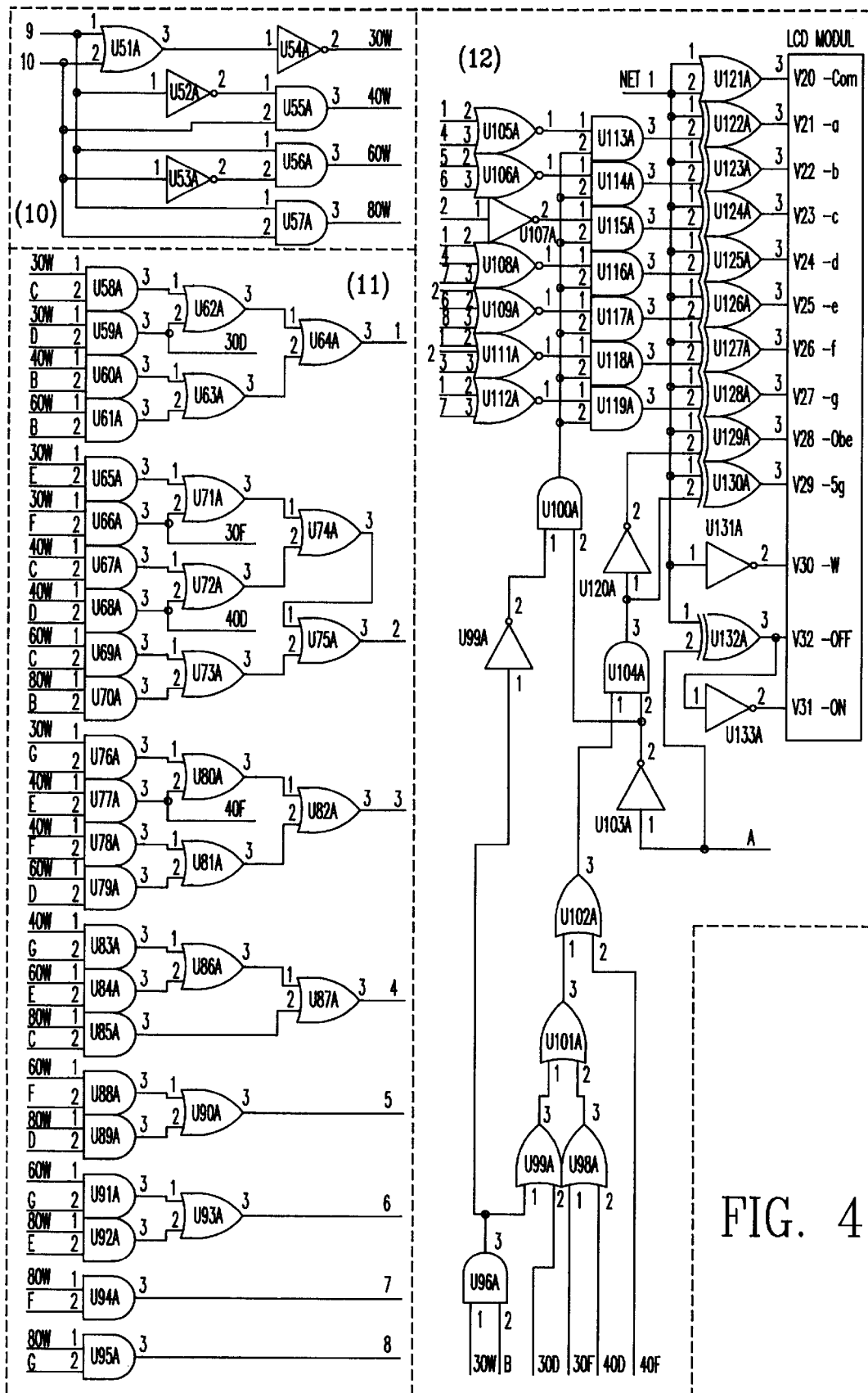
FIG. 4 is a detailed circuit diagram (Part-II) of the present invention (Part-II).

Referring to FIG. 1, an electric soldering iron with energy regulating control means is shown comprised of a perforated metal barrel 2a, a soldering tip 1a axially extended from one end namely the front end of the soldering tip 1a, a handle 4a, which has a diameter about 2.5 cm, a connector 3a connected between one end namely the rear end of the perforated metal barrel 2a and one end namely the front end of the handle 4a, a power cord 5a extended out of one end namely the rear end of the handle 4a, an electric heater mounted inside the perforated metal barrel 2a and connected between the soldering tip 1a and the power cord 5a, an integrated control circuit installed in the handle 4a for heating energy regulating control, a multi-step control switch 41a mounted on the periphery of the handle 4a and connected to the integrated control circuit in the handle 4a, and a LCD (liquid crystal display) 42a provided at the periphery of the handle 4a and controlled by the multi-step control switch 41a to display information including power on-off state, power ratio, etc. In an electric soldering iron of 60 W, the multi-step control switch 41a is a heating energy regulating control switch for OFF/10 W/20 W/40 W/40 W/50 W/60 W total seven state selections, and the LCD 42a is controlled to display one of these seven state selections subject to the control of the multi-step control switch 41a.

Referring to FIGS. from 2 through 4, the aforesaid integrated control circuit is comprised of a power supply circuit (1), a zero-crossing detecting circuit (2), a triggering pulse signal generating circuit (3), thyristor driving and control circuit (4), a time pulse oscillatory circuit (5), an power ratio selecting circuit (6), a power ratio synthesizing circuit (7), a power ratio type selector (8), a power ratio control circuit (9), a heater energy selecting circuit (10), a display decoder circuit (11), a LCD driver (12), and a initialization circuit (13).

The power supply circuit (1) directly drops the voltage of city power supply to the desired working voltage, and is comprised of D1,R1,D2,C1,T1. D1,R1,D2,C1 form a voltage rectifying and stabilizing circuit. D2 is a zener diode. T1 is a thyristor. Triggering is done by means of negative peak wave. Triggering signal 1 of the power supply circuit (1) is inputted into load L-1, which is the controlled electric soldering iron.

The zero-crossing detecting circuit (2) picks up power supply waveform synchronizing signal for pulse triggering. Power supply signal is shunt through R3,R4, then processed by flip-flop U1 into zero-crossing signal, and then synchronized through D type flip-flop U2, causing U2 to output stabilized zero-crossing signal The triggering pulse signal generating circuit (3) synthesizes the zero-crossing signal 3 and time pulse signal 2 into thyristor triggering pulse signal to trigger thyristor, and is comprised of shift recorder U4 and exclusion gate U5. Data input pin A of U4 connects to zero crossing signal 3. Time pulse signal 2 is connected to input pin CK of U4. Outputs QD and QH of shifting recorder U4 are 4 and 8 time pulse cycles from zero crossing signal. The time pulse frequency according to the present invention is 40 KHz. When zero crossing signal changes from 0 to 1, QD changes from 0 to 1 after a 100 μsec time delay (25 μsec×4−100 μsec), and QH changes from 0 to 1 after a 200 μsec time delay. Through exclusion gate U5, trigging pulse signal 5 is produced at zero crossing signal, and a pulse signal is produced 100 μsec after passing through zero point, and the width is exactly 100 μsec.

The thyristor driving and control circuit (4) controls the ratio of pulse signal 5 passing through, and amplifies electric current to drive thyristor. Pulse signal 5 and power ratio signal 6 are added to AND gate U6, thereby causing the time base and ratio of pulse signal output to be controlled, and therefore the heating energy of the electric soldering iron is regulated. Inverters U7,U8,U9 are connected in parallel to provide reversed pulse current used in driving thyristor T1.

The time pulse oscillatory circuit (5) provides a frequency about 40 KHz for synchronizing triggering pulse signal and zero crossing signal, and is comprised of U10,U11,R5,R6 and C2. Output frequency is determined by R5 and C2.

The power ratio selecting circuit (6) provides seven state control signals A,B,C,E,D,F,G, every state control signal represents a particular power ratio, and only one state is allowed to exist at a time. The power ratio selecting circuit (6) is comprised of eight 3-input AND Gates U12~19, decoding the combination of Y1,Y2,Y3,/Y1,/Y2,/Y3. The seven state control signals are defined as follows:

A—OFF, turning off the electric soldering iron.

B—Power ratio 1/6 or 2/8, i.e., electric current is allowed to pass at one cycle and stopped from passing at the other five cycles in case of 1/6.

C—Power ratio 2/6 or 4/8.

D—Power ratio 3/6 or 5/8.

E—Power ratio 4/6 or 6/8.

F—Power ratio 5/6 or 7/8.

G—Power ratio 6/6 or 8/8.

There are total 7 control pins. When 0, 6-stage (1/6) is selected). When 1, 8-stage (2/8) is selected.

The power ratio synthesizing circuit (7) uses logic gate arrangement to synthesize power ratio control signal 6 for heater power-on time base ratio control. Power ratio control signal 6 is obtained from the combination of one of state control signals B~G and zero crossing frequency eliminating signals Q1,Q2,Q3 and state signals 7,8 from power ratio type selector (8), and used to control the output ratio of triggering pulse signal.

The power ratio type selector (8) provides two power ratio calculation methods, which are selected subject to the potential level at control pin 7. If control pin 7 is set at 0, 8 of U40 is 1, therefore when Q2,Q3 of U39 are Hi, output Q of U42 is Hi, and U42 is reset, i.e., U42 starts to count from 0 every time when counts to 6. Therefore, the output value Q1,Q2, Q3 of U42 is changed within 0~5 for 6-stage power ratio control. If control pin 7 is set at 1, 8 of U40 is 0, the output of U39 is 0, therefore the output value Q1,Q2,Q3 of U42 is changed within 0~7 for 8-stage power ratio control.

The power ratio control circuit (9) uses a key button switch to select power ratio, so as to further control the heating temperature of the electric soldering iron. When started, RESET signal 4 is at RST pin of U47, causing output Y1Y2Y3 of U7 to be 0, at this time signal input pin CK of U47 is changed from Hi to Low, causing U47 to add by 1, so as to jump to a next state, for example state B. When 8 power source signal bicycles are released from hand, signal input pin CK of U47 is changed from Low to Hi, waiting for a next key button switch signal input, i.e., D type flip-flop U45 and counter U46 are matched to make the reaction of SW1 fast without causing an error. When SW1 is clicked once, it jumps to the next stage.

The heater energy selecting circuit (10) provides four different watt value selections, i.e., through 9,10 control pins, 30 W, 40 W, 60 W and 90 W are alternatively selected. The heater energy selecting circuit (10) is comprised of a decoder circuit formed of logic ICs U51~U57, and four outputs are selected to be 1 while the other three outputs are 0.

The display decoder circuit (11) is a liquid crystal display for showing power supply transmitting status and power supply consuming status subject to the type of electric heater used. The display decoder circuit (11) is comprised of decoder ICs U58~U95. The 30 W,40 W,60 W,80 W four state outputs of the aforesaid heater energy selecting circuit and the A,B,C,D,E,F,G seven power ratio signals of the aforesaid power ratio selecting circuit are decoded by decoder ICs U58~U95 to provide the required 0~9 data for the liquid crystal display.

The LCD driver (12) is designed subject to the signal formula for the liquid crystal display, and controlled to drive the liquid crystal display, causing it to show the messages of ON,OFF and 0 W~80 W. The LCD driver (12) is comprised of decoder ICs U96~U133.

The initialization circuit (13) produces reset signal 4 when power supply is initially inputted, causing the apparatus stayed at OFF status. When power supply is on, the input of U135 is Low, the output of U135 is Hi, enabling U136 to provide an output, i.e., 4 produces Hi, and this signal is a RESET signal. When VCC passes through R7 to charge C3, the input of U135 is changed to Hi, this signal causes the output of U47 to be 0, which is decoded to state A, i.e., Power Off state.

What the invention claimed is:

1. An electric soldering iron, comprising: a perforated metal barrel having a front end and a rear end, a soldering tip axially extended from the front end of said soldering tip, a handle having a front end and a rear end, a connector connected between the rear end of said perforated metal barrel and the front end of said handle, a power cord extended out of the rear end of said handle, an application specific integrated control circuit installed in said handle for heating power control, a single-key, multi-step control switch mounted on the periphery of said handle and connected to said integrated control circuit in said handle, and an LCD (liquid crystal display) provided at the periphery of said handle to display values selected through said multi-step control switch, said integrated control circuit being comprised of a power supply circuit, a zero-crossing detecting circuit for outputting a power supply waveform zero-crossing signal, a triggering pulse signal generating circuit for synthesizing the zero-crossing signal with a time pulse signal into a thyristor triggering pulse signal, a thyristor driving and control circuit for combining the triggering pulse signal and a power ratio signal in order to drive the thyristor, a time pulse oscillatory circuit for outputting the time pulse signal, a power ratio selecting circuit for providing control states representing various power ratios, a power ratio synthesizing circuit for synthesizing the power ratio signal using the control states and a ratio type signal, a power ratio type selector for selecting a power ratio calculation method and outputting the ratio type signal, a power ratio control circuit for selecting a power ratio based upon input from the control switch, a heater energy selecting circuit for providing a selected power level signal to a display decoder circuit for decoding the selected power level signal and the control state into data for an LCD driver showing the power level, and a initialization circuit.

2. The electric soldering iron of claim 1, wherein said zero-crossing detecting circuit receives a power supply waveform synchronizing signal for pulse triggering and includes a pair of shunt resistors for shunting said power supply signal, a flip-flop for processing said shunted power supply signal into a processed signal, and a D type flip-flop driven by the processed signal from said flip-flop for outputting a full-cycle zero-crossing signal.

3. The electric soldering iron of claim 2 wherein said triggering pulse signal generating circuit is comprised of a shift recorder and an exclusion gate for combining the zero-crossing signal and the time pulse signal into a thyristor triggering pulse signal for triggering a thyristor, said shift recorder having a data input pin for receiving the zero-crossing signal, a time pulse input pin for receiving the time pulse signal, and first and second outputs being 4 and 8 time pulse cycles after the zero-crossing signal, wherein the time pulse frequency is 40 KHz, the first output being changed from 0 to 1 after a 100 $\mu$sec time delay from when the zero-crossing signal changes from 0 to 1, and the second output being changed from 0 to 1 after a 200 $\mu$sec time delay, and wherein said thyristor triggering pulse signal is produced in response to the zero-crossing signal through said exclusion gate, and said thyristor triggering pulse signal is produced 100 $\mu$sec after the zero-crossing so that the width of said thyristor triggering pulse signal is exactly 100 $\mu$sec.

4. The electric soldering iron of claim 1 wherein said power ratio control circuit controls said power ratio selecting circuit, said power ratio synthesizing circuit and said power ratio type selecting circuit to form a power ON/OFF control state, a first 6-stage type of power ratio control including 1/6, 2/6, 3/6, 4/6, 5/6, and 6/6 power ratio control states and a second 6-stage type of power ratio control including 2/8, 4/8, 5/8, 6/8, 7/8, and 8/8 power ratio control states.

5. The electric soldering iron of claim 4 wherein said heater energy selecting circuit provides four different wattage value selections through two control pins thereof, said heater energy selecting circuit being comprised of a decoder circuit including logic ICs with four outputs to be selected by 1 and the other three outputs by 0; said LCD driver being comprised of decoder ICs for driving the liquid crystal display and causing it to show the messages of ON, OFF, and a power value.

* * * * *